United States Patent
Ogawa

(10) Patent No.: US 10,498,267 B2
(45) Date of Patent: Dec. 3, 2019

(54) METHOD FOR ADJUSTING A DRIVE SIGNAL

(71) Applicant: SEMICONDUCTOR COMPONENTS INDUSTRIES, LLC, Phoenix, AZ (US)

(72) Inventor: Takashi Ogawa, Gifu-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/120,826

(22) Filed: Sep. 4, 2018

(65) Prior Publication Data

US 2018/0375449 A1 Dec. 27, 2018

Related U.S. Application Data

(60) Continuation of application No. 15/495,587, filed on Apr. 24, 2017, now Pat. No. 10,084,398, which is a
(Continued)

(51) Int. Cl.
*H02P 6/04* (2016.01)
*H02P 6/17* (2016.01)
(Continued)

(52) U.S. Cl.
CPC ............... *H02P 6/153* (2016.02); *H02P 1/02* (2013.01); *H02P 6/085* (2013.01); *H02P 6/17* (2016.02);
(Continued)

(58) Field of Classification Search
CPC .... H02P 27/08; H02P 6/04; H02P 6/17; H02P 6/16; H02P 21/18; H02P 6/08; H02P 23/22; H02P 23/16; G01P 21/02
See application file for complete search history.

(56) References Cited

U.S. PATENT DOCUMENTS

| 5,012,169 A | * | 4/1991 | Ono | B25J 9/126 |
| | | | | 318/568.2 |
| 5,113,125 A | * | 5/1992 | Stacey | H02P 25/03 |
| | | | | 318/400.2 |

(Continued)

FOREIGN PATENT DOCUMENTS

| JP | 2006-299810 A | 11/2006 |
| JP | 2008-43166 A | 2/2008 |

(Continued)

OTHER PUBLICATIONS

Application Note AN44140A by Panasonic, Sine-wave PWM drive system and rotor position detection method by 1-Hall-sensor, 1-Hall-Sensor Driver IC for 3-phase Brushless Motor; Doc No. TA4-EA-06180; Established Apr. 19, 2013; Revised Nov. 21, 2013.

(Continued)

*Primary Examiner* — Marlon T Fletcher
(74) *Attorney, Agent, or Firm* — Rennie William Dover

(57) ABSTRACT

A method for adjusting a drive signal of a drive circuit. A period of the drive signal is determined and an advance angle count value is extracted from a storage register in accordance with the period of the drive signal. The advance angle count value and a first control signal are used to determine an advance angle adjustment range, where the first control signal is from a source external to the drive circuit. The advance angle adjustment range and a second control signal are used to determine an advance angle adjustment range start angle, where the second control signal is from a source external to the drive circuit.

15 Claims, 7 Drawing Sheets

Related U.S. Application Data division of application No. 14/578,433, filed on Dec. 20, 2014, now Pat. No. 9,667,176.

(60) Provisional application No. 61/918,693, filed on Dec. 20, 2013.

(51) Int. Cl.
  *H02P 6/15* (2016.01)
  *H02P 6/182* (2016.01)
  *H02P 1/02* (2006.01)
  *H02P 6/20* (2016.01)
  *H02P 27/08* (2006.01)
  *H02P 6/08* (2016.01)

(52) U.S. Cl.
  CPC ............... *H02P 6/182* (2013.01); *H02P 6/20* (2013.01); *H02P 27/085* (2013.01)

(56) References Cited

U.S. PATENT DOCUMENTS

| | | | |
|---|---|---|---|
| 5,739,650 A | | 4/1998 | Kimura et al. |
| 5,796,226 A | * | 8/1998 | Ookawa ............... H02P 6/15 318/254.1 |
| 5,850,130 A | | 12/1998 | Fujisaki et al. |
| 6,037,741 A | * | 3/2000 | Yamada ............... H02P 6/185 318/254.2 |
| 6,359,406 B1 | | 3/2002 | Chiu et al. |
| 6,483,270 B1 | | 11/2002 | Miyazaki et al. |
| 8,729,839 B2 | | 5/2014 | Suzuki et al. |
| 9,748,877 B2 | | 8/2017 | Ogawa |
| 2005/0225275 A1 | | 10/2005 | Eskritt et al. |
| 2009/0001922 A1 | | 1/2009 | Hasegawa et al. |
| 2009/0267549 A1 | * | 10/2009 | Kitagawa ............... H02P 23/14 318/400.14 |
| 2009/0284196 A1 | | 11/2009 | Kuo et al. |
| 2013/0221880 A1 | | 8/2013 | Sekihara |
| 2014/0001999 A1 | * | 1/2014 | Sato ............... H02P 27/08 318/503 |
| 2014/0035496 A1 | * | 2/2014 | Mizuo ............... H02P 6/15 318/400.17 |
| 2014/0062364 A1 | | 3/2014 | Petri et al. |
| 2014/0167662 A1 | | 6/2014 | Ajima et al. |
| 2014/0167666 A1 | | 6/2014 | Alcorn et al. |
| 2015/0023804 A1 | | 1/2015 | Sugiura |
| 2015/0061547 A1 | | 3/2015 | Gougani et al. |
| 2015/0180388 A1 | * | 6/2015 | Ogawa ............... H02P 6/182 318/400.14 |
| 2015/0180390 A1 | | 6/2015 | Ogawa |
| 2016/0315568 A1 | | 10/2016 | Ogawa |
| 2017/0093314 A1 | | 3/2017 | Esvelt et al. |
| 2017/0229985 A1 | | 8/2017 | Ogawa |

FOREIGN PATENT DOCUMENTS

| | | |
|---|---|---|
| JP | 4662729 B2 | 3/2011 |
| JP | 2012-105406 A | 5/2012 |
| JP | 2012-222950 A | 11/2012 |
| JP | 2013-31273 A | 2/2013 |
| JP | 2013-81320 A | 5/2013 |
| JP | 2013-183478 A | 9/2013 |

OTHER PUBLICATIONS

Application Note LV8804FV from ON Semiconductor, Bi-CMOS LSI PC and Server Fan Motor Driver Application Note, pp. 1-29, Dec. 2013, Semiconductor Components Industries, LLC, http://onsemi.com.

Datasheet No. BD63241FV from ROHM Semiconductor, DC Brushless Motor Drivers Three Phase 1 Hall Full-Sine Fan Motor Driver, pp. 1-15, 2013, TSZ22111-14-001, www.rohm.com.

Datasheet LV11961HA from ON Semiconductor, Bi-CMOS LSI for Brushless Motor Drive Sine Wave PWM Drive, Pre driver IC, pp. 1-14, Oct. 2014, Rev. 1, Publication Order No. LA11961HA/D, Semiconductor Components Industries, LLC, http://onsemi.com.

Datasheet LV8139JA from ON Semiconductor, Bi-CMOS LSI Single-phase Fan Motor Driver, pp. 1-18, May 2013, Ordering No. ENA2154, Semiconductor Components Industries, LLC, http://onsemi.com.

\* cited by examiner

METHOD FOR ADJUSTING A DRIVE SIGNAL

The present application is a continuation application of U.S. patent application Ser. No. 15/495,587 filed on Apr. 24, 2017, by Takashi Ogawa, titled "MOTOR CONTROL CIRCUIT AND METHOD" which is a divisional application of U.S. patent application Ser. No. 14/578,433 filed on Dec. 20, 2014, now U.S. Pat. No. 9,667,176, by Takashi Ogawa, titled "MOTOR CONTROL CIRCUIT AND METHOD" which is a nonprovisional application of U.S. Provisional Patent Application No. 61/918,693, filed on Dec. 20, 2013, which applications are hereby incorporated by reference in their entirety, and priority thereto for common subject matter is hereby claimed.

BACKGROUND

The present invention relates, in general, to motors and, more particularly, to three phase motors.

Multi-phase motors are used in a variety of applications including disc drives, digital video disc players, scanners, printers, plotters, actuators used in automotive and aviation industries, etc. Generally, multiple phase motors include a stationary portion or stator that produces a rotating magnetic field and a non-stationary portion or rotor in which torque is created by the rotating magnetic field. The torque causes the rotor to rotate which in turn causes a shaft connected to the rotor to rotate. The motors are driven by motor drive circuits.

Motor drive circuits are designed to meet desired motor performance parameters which may include noise level specifications, start-up specifications, maximum rotational speed specifications, etc. Noise specifications may be set to provide continuity of current flow during motor startup, or during motor rotation, or during motor stoppage. Start-up or motive power specifications may be set so that the motor reliably starts. Rotational speed specifications may be set to ensure there is sufficient torque drive to cover a large number of different motors. For example, the desired rotational speed of a server is higher than that of a personal computer. It is commonly believed that three-phase motors are better at achieving the desired specifications compared to single phase motors; however, three-phase motors cost more than single phase motors. In addition, three-phase motors provide current having sinusoidal characteristics from motor start-up to motor stoppage or cessation and they allow accurate determination of motor position and rotation speed. Three-phase motors typically include three Hall sensors, which is one of the reasons these motors are more expensive to manufacture. A Hall sensor may be referred to as a Hall element. U.S. Pat. No. 6,359,406 issued to Hsien-Lin Chiu et al. on Mar. 19, 2002, discloses three-phase motors and in particular discloses a three-phase motor having two Hall sensors or two Hall elements. A drawback with this technology is that it uses special bias circuitry that complicates its design and increases costs. A technique to lower the cost of three-phase motors is to manufacture the motor drive circuitry as a sensorless motor drive circuit, i.e., a motor without sensors. U.S. Pat. No. 6,570,351 issued to Shinichi Miyazaki et al. on May 27, 2003, discloses a three-phase motor without sensors. A drawback with sensor-less motor drive configurations is that they may fail to start if the inductive voltage of the coil is small. Another drawback with this circuitry is that the lead angles are not optimized for different applications.

Accordingly, it would be advantageous to have a multi-phase motor drive circuit and a method for driving the motor that is suitable for providing lead angles for different motors. It is desirable for the multi-phase drive circuit and method to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which.

Figure 1:
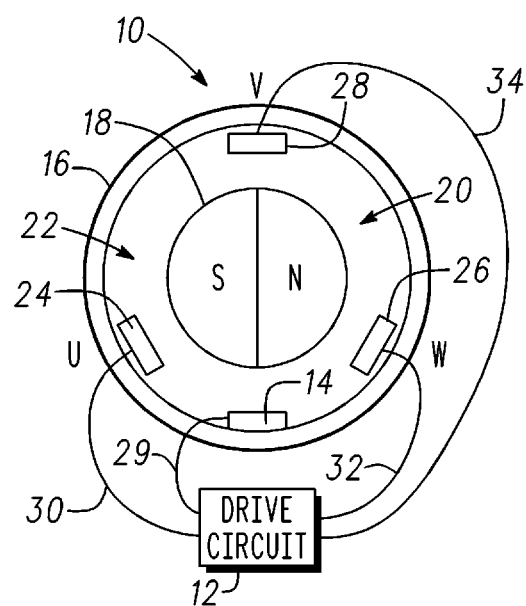
FIG. 1 is a diagrammatic representation of a motor that is driven by a drive circuit in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain n-channel or p-channel devices, or certain n-type or p-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage or logic low voltage level and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level, a logic high voltage, or a logic one voltage and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

The present description includes, among other features, a motor drive circuit and a method for driving a motor that includes adjusting a lead angle of a position indicator signal. The position indicator signal may be referred to as an FG signal or a Hall sensor comparison signal. A control circuit controls logic processing functions to adjust the appropriate amount of a lead at angle at any speed using two external pins. A pseudo FG signal is generated in response to the voltages applied to the two external pins, wherein the pseudo FG signal has a lead angle that can be optimized at any speed by adjusting one external pin for fast motor speeds and adjusting the other external pin for slow motor speeds. It should be noted that lead angle control may not be performed during start up, but after the motor has gone through a number of rotations.

Default values of the advance angle can be set by setting the external pins to a source of operating potential, e.g., $V_{SS}$ or $V_{DD}$, using a pull down resistor or a pull up resistor.

In accordance with an embodiment, a motor having a stator, a rotor, a plurality of coils coupled to the stator, and at least one Hall sensor coupled to the stator is provided. A position indicator signal is generated in response to a signal from the at least one Hall sensor, wherein the position indicator signal has a first period. A phase shift value using the position indicator signal is generated. Then, the position indicator signal is adjusted to generate an adjusted position indicator signal in response to the phase shift value.

In accordance with an aspect, generating the adjusted position indicator signal includes determining a number of times the position indicator signal transitions from a first level to a second level before a difference between a first edge of the position indicator signal and a corresponding first edge of the adjusted position indicator signal stabilize to form a first count value. Then, the first count value is multiplied with a predetermined number to generate a multiplied count value. The multiplied count value is used to determine an amount to advance the position indicator signal to form the adjusted position indicator signal. In accordance with another aspect, a count adjustment value is selected from a count adjustment value storage register. The count adjustment value and a first control signal coupled to a first external pin are used to determine a slope of a first count adjustment parameter. The first count adjustment parameter and a second control signal from a second external pin are used to determine a second count adjustment parameter.

In accordance with another aspect, the second count adjustment value is combined with an advance angle control signal to generate a correction factor.

In accordance with another aspect, using the multiplied count value to determine an amount to advance the adjusted position indicator signal includes combining the multiplied count value with the correction factor to generate the adjusted position indicator signal.

In accordance with another aspect, the advance angle signal is generated by determining a number of times the position indicator signal transitions from the first level to the second level and generating a start signal in response to the number of times the position indicator signal transitions from the first level to the second level.

In accordance with another embodiment, a method for adjusting a drive signal for a motor, comprises providing a drive circuit having a first pin and a second pin, wherein the drive circuit generates the drive signal and determining a period of the drive signal. An advance angle count value is extracted from a storage register in accordance with the period of the drive signal and the advance angle count value and a first control signal coupled to the first input pin are used to determine an advance angle adjustment range wherein the first control signal is from a source external to the drive circuit. The advance angle adjustment range and a second control signal coupled to the second input pin are used to determine an advance angle adjustment range start angle wherein the second control signal is from a source external to the drive circuit.

In accordance with another aspect, a first advance angle and a second advance angle are determined.

In accordance with another aspect, the first advance angle is a minimum advance angle and the second advance angle is a maximum advance angle.

In accordance with another aspect, an angle determination slope is determined using the first advance angle and the second advance angle.

In accordance with another embodiment, a driver circuit includes a lead angle adjustment circuit, wherein the lead angle adjustment circuit comprises a first counter having an input and an output and a multiplier circuit having an input and an output. The input of the multiplier circuit is coupled to the output of the first counter. A subtractor circuit having a first input, a second input is coupled to the output of the multiplier circuit. A storage register having an input and an output is coupled to the output of the first counter. A slope determination circuit having a first input, a second input and an output is coupled to the output of the register, wherein the second input of the slope determination circuit is coupled to a first external pin of the lead angle adjustment circuit. A multiplier circuit having a first input, a second input, and an output is coupled to the second input of the slope determination circuit. An input of the multiplier circuit is coupled to an external pin. An addition circuit having an input and an output is coupled to the first summer.

FIG. 1 is a diagrammatic representation of a three-phase motor 10 that is driven by a drive circuit 12 in response to one or more signals from a Hall sensor 14 in accordance with an embodiment of the present invention. Drive circuit 12 may be referred to as a driver and Hall sensor 14 may be referred to as a Hall element. Three-phase motor 10 includes a stator 16 and a rotor 18 having a portion 20 magnetized with a first pole and a portion 22 magnetized with a second pole. By way of example, portion 20 is a north pole and portion 22 is a south pole. A coil 24 is coupled to or mounted on a portion of stator 16, a coil 26 is coupled to or mounted on another portion of stator 16, and a coil 28 is coupled to or mounted on yet another portion of stator 16. Drive circuit 12 is coupled to Hall sensor 14 via an electrical interconnect 29, to coil 24 via an electrical interconnect 30, to coil 26 via an electrical interconnect 32, and to coil 28 through an electrical interconnect 32. Coil 24 may be referred to as a U-phase winding, coil 26 may be referred to as a W-phase winding, and coil 28 may be referred to as a V-phase winding. Electrical interconnects 30, 32, and 34 may be wires, electrically conductive traces, or the like.

Figure 2:
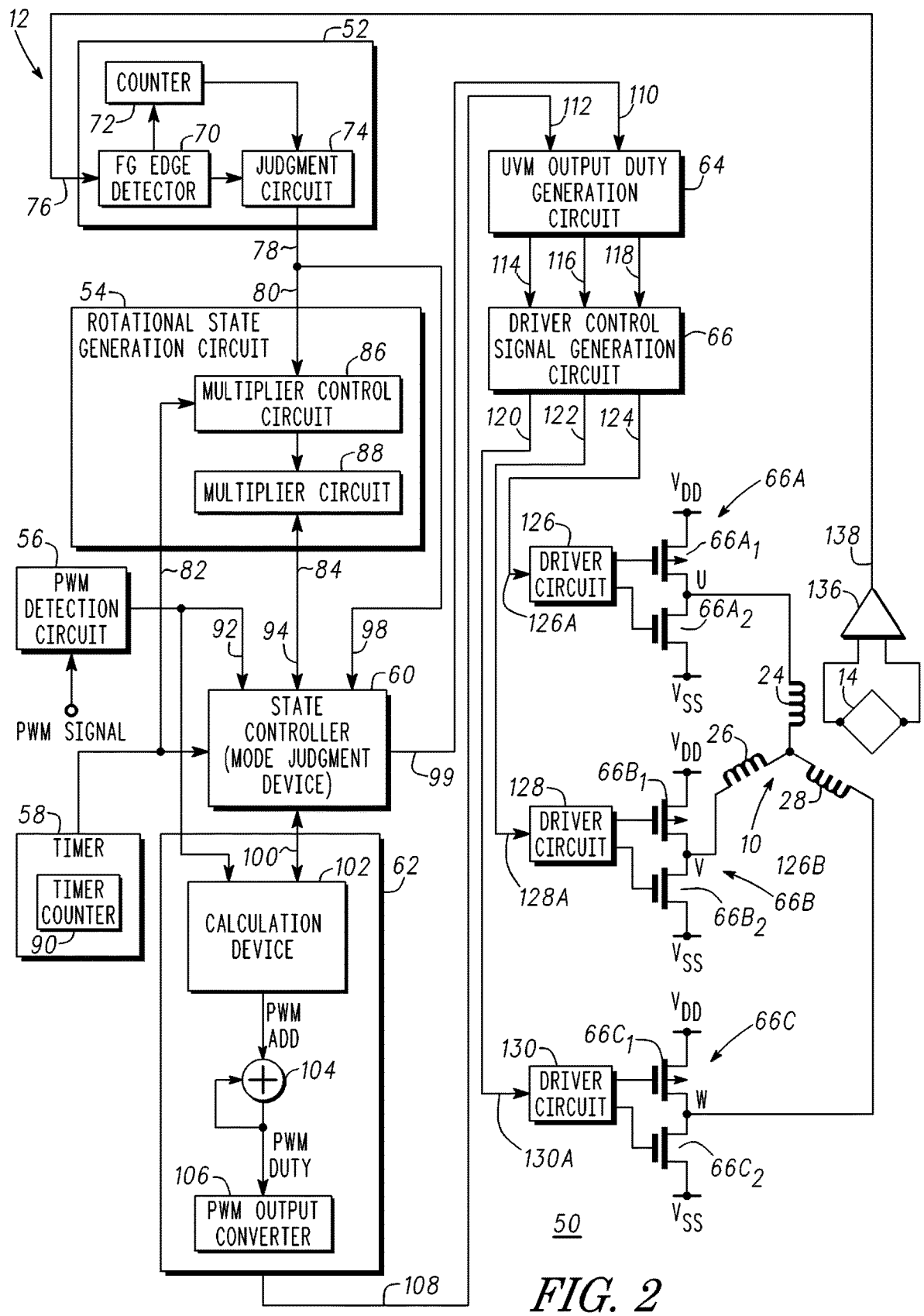
FIG. 2 is a block diagram further illustrating the drive circuit of FIG. 1.

FIG. 2 is a block diagram 50 further illustrating drive circuit 12. It should be noted that block diagram 50 includes diagrammatic representations of drive circuit 12, three-phase motor 10, and Hall sensor 14. Drive circuit 12 includes an FG signal masking circuit 52, a rotational state generation circuit 54, a pulse width modulation ("PWM") detection circuit 56, a timer 58, a status controller 60, a duty control controller 62, an output duty generation circuit 64, a drive control signal generation circuit 66, and an output drive stage 68. More particularly, FG signal masking circuit 52 may be comprised of an FG signal edge detector 70, a counter 72, and an FG signal judgment circuit 74. FG signal edge detector 70 has an input that serves as an input 76 of drive circuit 12, an output connected to an input of counter 72 and an output connected to an input of FG signal judgment circuit 74. An output 78 of FG signal judgment circuit 74 serves as an output of FG signal masking circuit 52. FG signal masking circuit 52 may be referred to as a chattering mitigation circuit or a chattering mitigation feature.

Rotational state generation circuit 54 has inputs 80 and 82, an input/output 84, and may be referred to as an FG generation circuit. Output 78 of FG signal masking circuit 52 is connected to input 80 of FG generation circuit 54. Input/output 84 may be referred to as an input/output node, an I/O node, an input/output terminal, an I/O terminal, or the like. Rotational state generation circuit 54 may be comprised of a control circuit 86 coupled to a multiplier circuit 88. It should be noted that input 80 and input 84 are connected to multiplier control circuit 86 and input/output 84 is connected to multiplier circuit 88. PWM detection circuit 56 has an output connected to an input of state controller 60 and to an input of duty control controller 62 and is configured to determine the speed of rotor 18. It should be noted that if the duty range is small the speed of the rotor is smaller than if the duty range is large. Timer 58 has an output connected to input 82 of rotational state generation circuit 54 and to an input 92 of state controller 60 and may include a timer counter 90. In addition, state controller 60 has an input/output 94 connected to an input/output 84 of rotational state generation circuit 54, an input 98 connected to output 78 of FG signal masking circuit 52, and an input/output 96 connected to an input/output 100 of duty control controller 62. By way of example, duty control controller 62 is comprised of a calculation device 102 configured to determine an amount of change to the duty cycle, a summer 104, and a PWM converter 106. Calculation device 102 has an input that serves as input/output 100 and an output connected to an input of summer 104. In addition, summer 104 has an output that is connected to an input of PWM output converter 106 and to another input of summer 104. An output 108 of PWM output converter 106 serves as an output of duty control controller 62. State controller 60 is configured for determining the status or condition of the FG signal and the PWM signal and duty control controller 62 is configured to control an output sine wave, which helps to make the motor quieter.

Output duty generation circuit 64 has an input 110 connected to an output 99 of output of state controller 60, an input 112 connected to output 108 of output duty generation circuit 62, and a plurality of outputs 114, 116, and 118 connected to corresponding inputs of drive control signal generation circuit 66, which signal generation circuit 66 has a plurality of outputs 120, 122, and 124 connected to corresponding inputs of output drive stage 68. In accordance with an embodiment, drive stage 68 includes driver devices 126, 128, and 130 having inputs that serve as inputs 126A, 128A, and 130A of output drive stage 68, a pair 66A of transistors having a terminal connected to U-phase winding 24, a pair 66B of transistors having a terminal connected to W-phase winding 26, and a pair 66C of transistors having a terminal connected to V-phase winding 28. Pair of transistors 66A is comprised of transistors $66A_1$ and $66A_2$, wherein each transistor has a control electrode, and a pair of current carrying electrodes. The control electrodes of transistors $66A_1$ and $66A_2$ are coupled for receiving control signals from driver device 126, one current carrying electrode of transistor $66A_1$ is coupled for receiving a source of potential $V_{DD}$ and the other current carrying electrode of transistor $66A_1$ is connected to a current carrying electrode of transistor $66A_2$. The other current carrying terminal of transistor $66A_2$ is coupled for receiving a source of potential $V_{SS}$ such as, for example, a ground potential. The commonly connected current carrying electrodes of transistors $66A_1$ and $66A_2$ are connected to U-phase winding 24.

Pair of transistors 66B is comprised of transistors $66B_1$ and $66B_2$, wherein each transistor has a control electrode, and a pair of current carrying electrodes. The control electrodes of transistors $66B_1$ and $66B_2$ are coupled for receiving control signals from driver device 128, one current carrying electrode of transistor $66B_1$ is coupled for receiving a source of potential $V_{DD}$ and the other current carrying electrode of transistor $66B_1$ is connected to a current carrying electrode of transistor $66B_2$. The other current carrying terminal of transistor $66B_2$ is coupled for receiving a source of operating potential $V_{SS}$ such as, for example, a ground potential. The commonly connected current carrying electrodes of transistors $66B_1$ and $66B_2$ are connected to U-phase winding 26.

Pair of transistors 66C is comprised of transistors $66C_1$ and $66C_2$, wherein each transistor has a control electrode, and a pair of current carrying electrodes. The control electrodes of transistors $66C_1$ and $66C_2$ are coupled for receiving control signals from driver device 130, one current carrying electrode of transistor $66C_1$ is coupled for receiving a source of potential $V_{DD}$ and the other current carrying electrode of transistor $66C_1$ is connected to a current carrying electrode of transistor $66C_2$. The other current carrying terminal of transistor $66C_2$ is coupled for receiving a source of operating potential $V_{SS}$ such as, for example, a ground potential. The commonly connected current carrying electrodes of transistors $66C_1$ and $66C_2$ are connected to U-phase winding 28.

A comparator 136 has inputs connected to corresponding inputs of a Hall sensor 14 and an output 138 connected to input 76 of rotational state generation circuit 54.

It should be noted that in accordance with an alternative embodiment, FG signal masking circuit 52 is absent from drive circuit 12 and that output 138 of comparator 136 is commonly connected to input 76 of rotational state generation circuit 54 and to input 98 of state controller 60.

In accordance with another embodiment of the present invention, the efficiency of the rotation of a rotor of a motor is improved by adjusting the lead angle of the drive signal. It should be noted that the lead angle may also be referred to as an advance angle. By way of example, a drive circuit such as drive circuit 12 may be configured to have two external pins to which a pseudo-FG signal may be applied to control the lead angle of the drive signal. A Hall sensor, such as Hall sensor 14, provides data regarding the rotational speed of the rotor. One external pin may be used in response to the rotor operating at a slower speed and the other external pin may be used in response to the rotor operating at a higher speed. The advance angle may be determined by applying a voltage to one pin for a rotor operating at low speed and applying a voltage at the other pin for a rotor operating at a high speed. An operating point that includes the desired advance angle can be determined using a linear analysis between the low speed operation and the high speed operation. The advance angle may be increased at a fixed rate.

In accordance with an embodiment, an advance angle value is determined based on data for rotation speed obtained from a single Hall sensor. The value of the advance angle is determined by strait line approximation running between a point during low-speed rotation and a point during high-speed rotation. The point used for both low-speed rotation and high-speed rotation may be changed by using external pins.

The advance angle control is useful after rotation has been initiated. The advance angle value is increased at a fixed rate determined by the strait line approximation based on an increase of rotation speed. Because two points are used for the strait-line approximation for determining an advance angle value, less data is used and it is able to work efficiently without enlarging circuit size.

Figure 3:
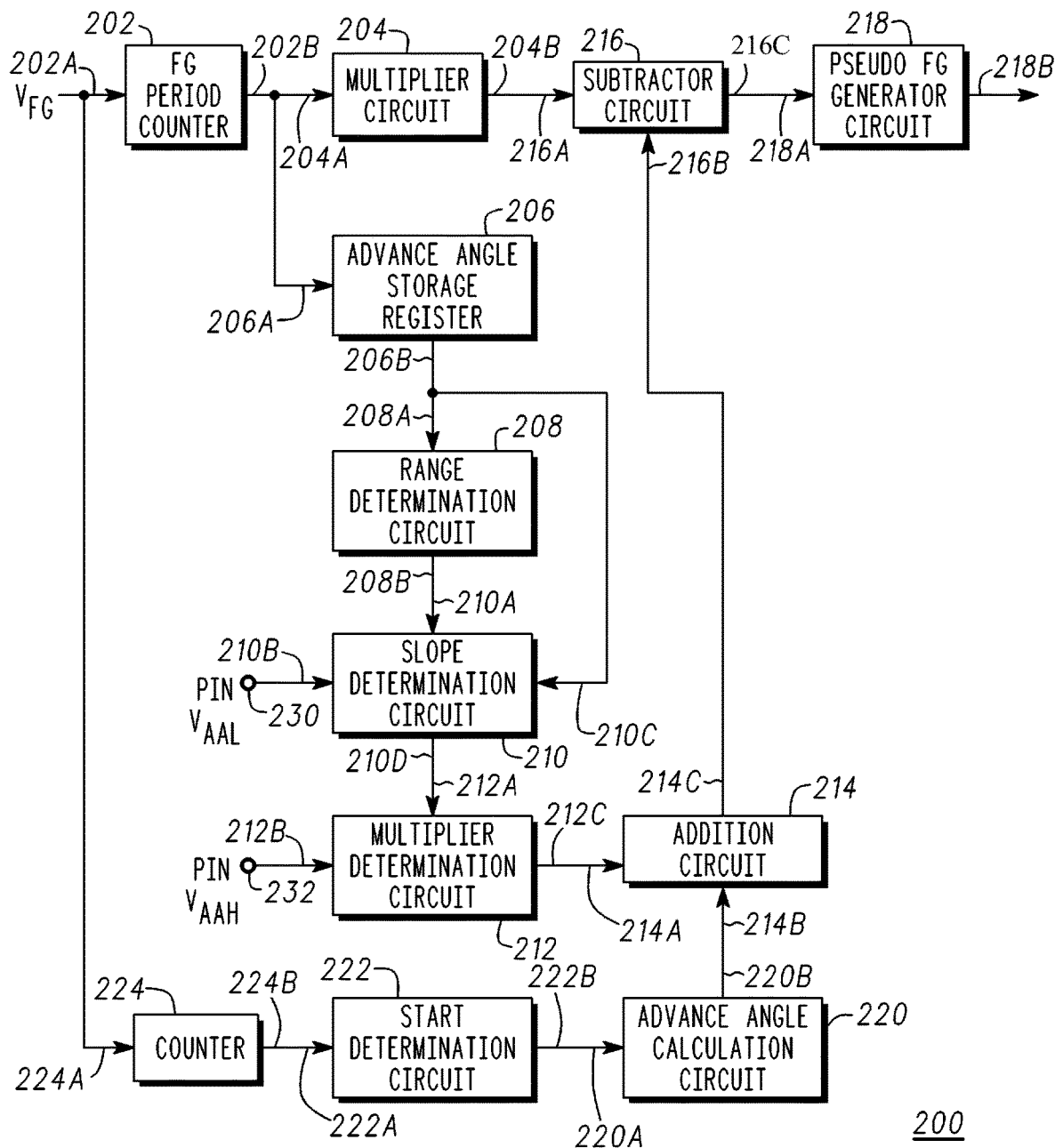
FIG. 3 is a circuit diagram of a lead angle adjustment circuit in accordance with an embodiment of the present invention.

FIG. 3 is a circuit diagram of a lead angle adjustment circuit 200 in accordance with an embodiment of the present invention. What is shown in FIG. 3 is an FG period counter 202, a multiplier circuit 204, an advance angle storage register 206, an advance angle range calculation circuit 208, an advance angle slope counter circuit 210, an advance angle initial addition calculation circuit 212, an addition circuit 214, a subtractor circuit 216, a Pseudo-FG generation circuit 218, an advance angle addition circuit 220, a start determination circuit 222, and a counter 224. Advance angle range calculation circuit 208 may be referred to as an advance angle range determination circuit, advance angle slope counter circuit 210 may be referred to as an advance angle slope determination circuit, and advance angle initial addition calculation circuit 212 may be referred to as a multiplier determination circuit. More particularly, FG period counter 202 has an input 202A coupled for receiving a comparator signal $V_{FG}$ from, for example, comparator 136 of FIG. 2 and an output 202B connected to an input 204A of multiplier circuit 204 and to an input 206A of an advance angle storage register 206. Multiplier circuit 204 has an output 204B connected to an input 216A of subtractor circuit 216.

Advance angle storage register 206 has an output 206B connected to an input 208A of range determination circuit 208 and to an input 210C of slope determination circuit 210. Range determination circuit 208 has an output 208B connected to an input 210A of slope determination circuit 210. In addition, slope determination circuit 210 has an input 210B coupled for receiving an advance angle control signal $V_{AAL}$ from an external pin 230 and an output 210D connected to an input 212A of a multiplier determination circuit 212, which circuit 212 has an input 212B coupled for receiving an advance angle control signal $V_{AAH}$ from an external pin 232. An addition circuit 214 has an input 214A connected to an output 212C of multiplier determination circuit 212, an input 214B connected to an output 220B of an advance angle calculation circuit 220, and an output 214C connected to an input 216B of subtractor circuit 216. Counter 224 has an input 224A coupled for receiving comparator signal $V_{FG}$ and an output 224B connected to an input 222A of start determination circuit 222, which circuit 222 has an output 222B connected to an input 220A of advance angle calculation circuit 220.

Subtractor circuit 216 has an output 216C connected to an input 218A of pseudo-FG generation circuit 218, which circuit 218 has an output 218B connected to control circuit 12 for transmitting a pseudo-FG signal.

Figure 4:
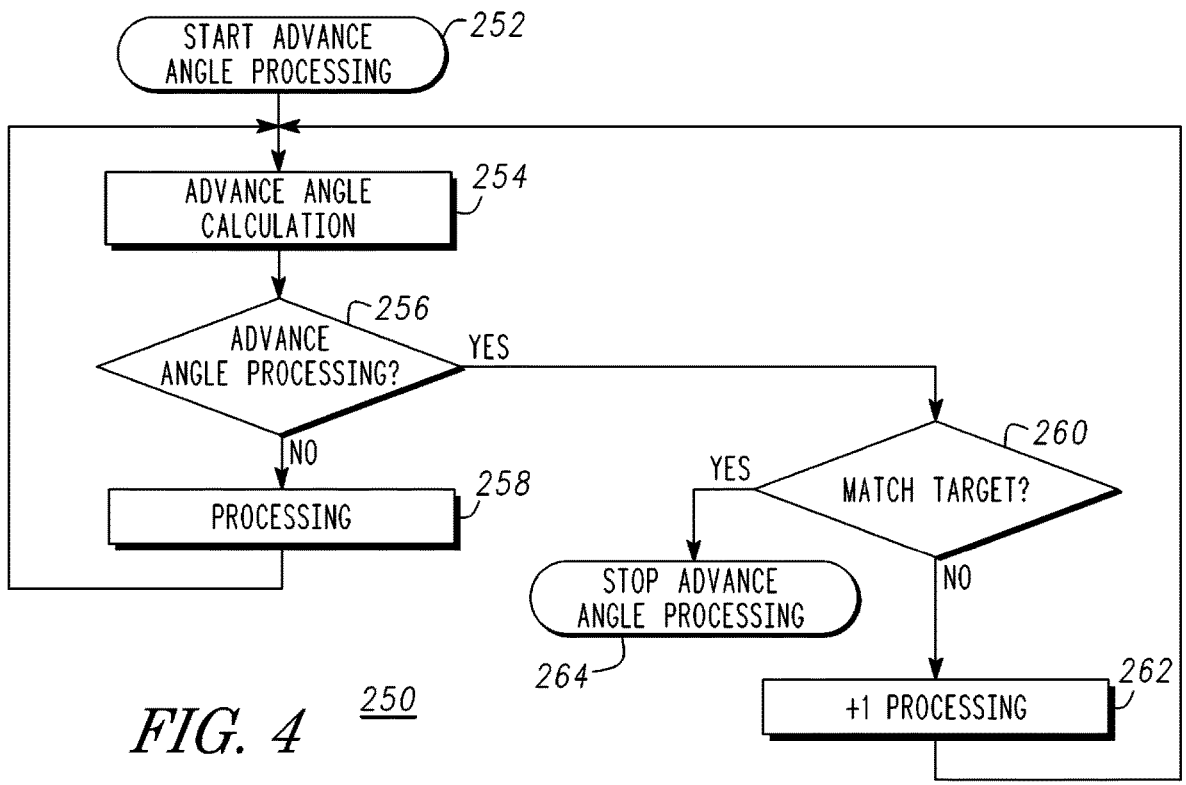
FIG. 4 is a flow diagram illustrating advance angle determination in accordance with an embodiment of the present invention.

FIG. 4 is a flow diagram 250 illustrating the advance angle determination in accordance with an embodiment of the present invention. Box 252 represents the start of advance angle processing. Lead angle adjustment circuit 200 operates in a normal advance angle calculation processing mode as indicated by box 254. In response to an FG signal at input 202A, advance angle processing circuit 200 determines whether to adjust the advance angle as indicated by decision diamond 256. In response to control circuit 12 determining that the rotor is not turning, i.e., the NO branch of decision diamond 256 and box 258, control circuit 12 continues operating in a normal processing mode. In response to control circuit 12 determining that the advance angle or lead angle should be adjusted, lead angle adjustment circuit 200 determines whether the lead angle of signal VFG equals a target value as indicated by decision diamond 260. If the lead angle matches the target value then advance angle processing is terminated as indicated by the YES branch of decision diamond 260. If the lead angle does not match the target value as indicated by the NO branch of decision diamond 260 and box 262, the lead angle adjustment circuit 200 continues adjusting the lead angle by returning to the process indicated by box 254.

Figure 5:
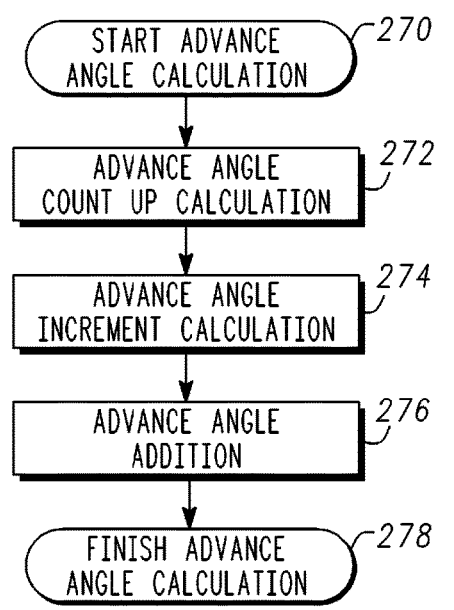
FIG. 5 is flow diagram showing the advance angle calculation process in accordance with an embodiment of the present invention.

FIG. 5 is flow diagram 270 showing the advance angle calculation process in accordance with an embodiment of the present invention. Lead angle adjustment circuit 200 begins the lead angle count up calculation process in response to FG frequency information. The calculation process begins as indicated by box 272 and the advance angle count up is calculated as indicated by box 274. Then the advance lead angle adjustment circuit 200 adjusts the lead angle as indicated by box 276. In response to adjusting the lead angle to the desired value, the advance angle calculation is complete as indicated by box 278.

Figure 6:
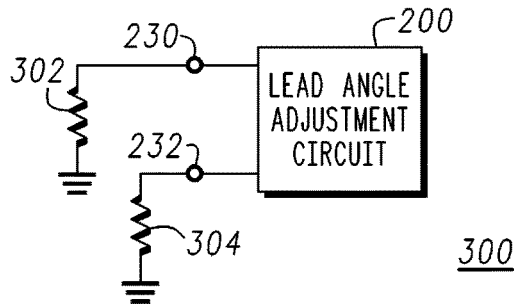
FIG. 6 is a circuit diagram illustrating a circuit configuration in which pins of a lead angle adjustment circuit are coupled for receiving a ground signal in accordance with an embodiment of the present invention.

FIG. 6 is a circuit diagram 300 illustrating a circuit configuration in which pins 230 and 232 of lead angle adjustment circuit 200 are coupled for receiving a ground signal through resistors 302 and 304. It should be noted that pins 230 and 232 are external to the packaging material that protect, for example, a semiconductor chip. Resistors serve as pull-down resistors. It should be appreciated that lead angle adjustment circuit 200 has been described with reference to FIG. 3. By way of example, resistors 302 and 304 are set at values of 47 Kilohms (47 KΩ).

Figure 7:
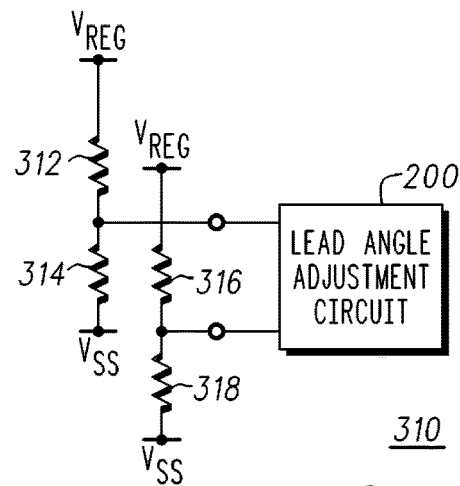
FIG. 7 is a circuit diagram illustrating a circuit configuration in which pins of a lead angle adjustment circuit are coupled to voltage divider networks in accordance with an embodiment of the present invention.

FIG. 7 is a circuit diagram 310 illustrating a circuit configuration in which pins 230 and 232 of lead angle adjustment circuit 200 are coupled to voltage divider networks 309 and 313. In accordance with an embodiment, voltage divider network 309 is comprised of resistors 312 and 314, where resistor 314 has a terminal coupled for receiving an operating potential $V_{SS}$ and a terminal connected to a terminal of resistor 312 at input pin 230. By way of example operating potential $V_{SS}$ is a ground potential. The other terminal of resistor 312 is coupled for receiving a control voltage $V_{REG}$. The voltage at input pin 230 is set in accordance with the values of resistor 312 and 314. For example, the values of resistors 312 and 314 may be 15 kΩ and 47 kΩ and the voltage at input pin 230 is approximately $0.75*V_{REG}$. Similarly, voltage divider network 313 is comprised of resistors 316 and 318, where resistor 318 has a terminal coupled for receiving an operating potential $V_{SS}$ and a terminal connected to a terminal of resistor 316 at input pin 232. The other terminal of resistor 316 is coupled for receiving a control voltage $V_{REG}$. The voltage at input pin 232 is set in accordance with the values of resistors 316 and 318. For example, the values of resistors 316 and 318 may be 47 kΩ and 15 kΩ and the voltage at input pin 230 is approximately $0.25*V_{REG}$.

Figure 8:
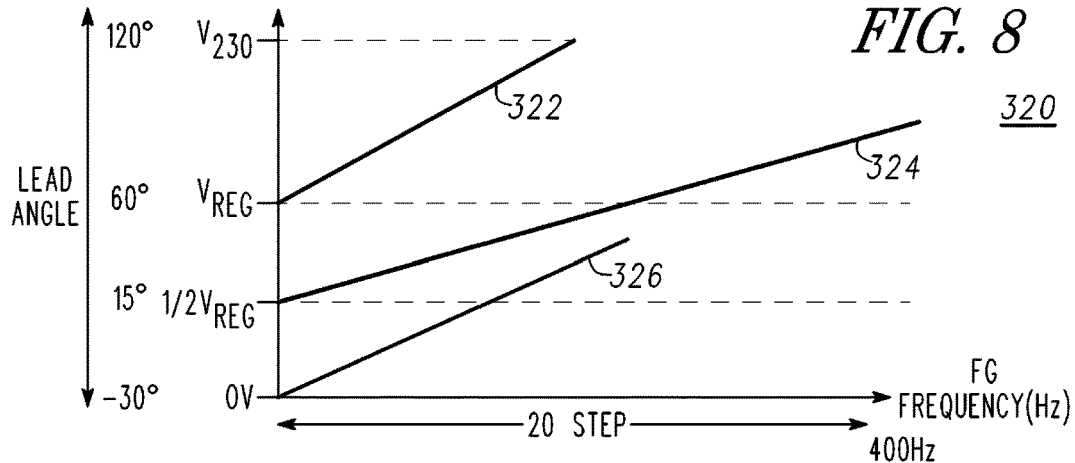
FIG. 8 illustrates a plot suitable for use in setting an advance angle in accordance with an embodiment of the present invention.
Figure 9:
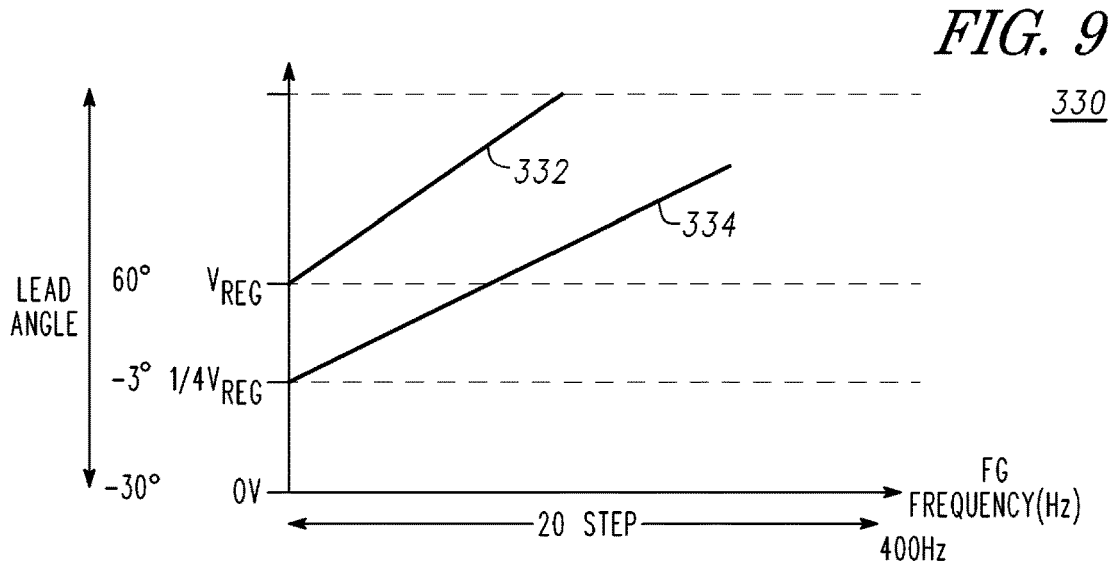
FIG. 9 illustrates a plot suitable for use in setting an advance angle in accordance with an embodiment of the present invention.

FIGS. 8 and 9 illustrate plots 320 and 330, respectively, for setting an advance angle or lead angle in accordance with an embodiment of the present invention. Plots 320 and 330 illustrate the voltage at pin 230 versus the frequency of the FG signal and the lead angle versus frequency. It should be noted that the speed of the motor, i.e., the revolutions per minute, can be determined from the FG frequency. Plots 320 and 322 may be derived from equation 1 (EQT. 1)

$$\text{Lead Angle}=A*fFG+B \qquad \text{EQT.1}$$

where:

A is derived from pin 232;

B is derived from pin 230; and fFG is derived from the frequency of the FG signal.

Figure 10:
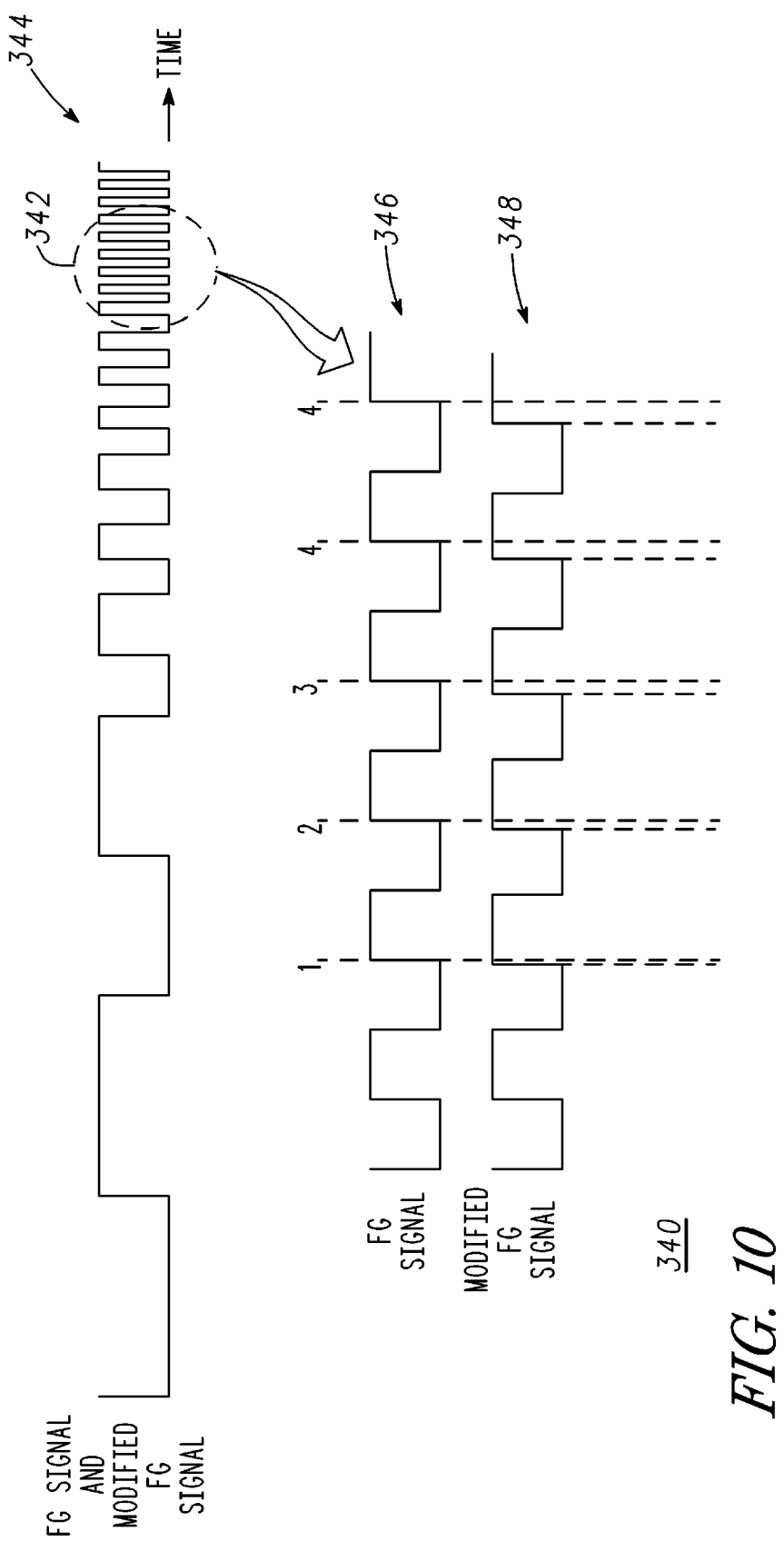
FIG. 10 is a plot illustrating a portion of a method for driving a motor in accordance with an embodiment of the present invention.

As discussed with reference to FIG. 5, lead angle adjustment circuit 200 counts the number of delta FG signals, i.e., the number times the difference between an edge of the FG signal and an edge of the drive signal changes. Briefly referring to FIG. 10, a plot 340 of the FG signal and the modified FG signal versus time is illustrated. The portion 344 of plot 340 represents the FG signal and the modified FG signal. At startup the FG signal has a period that decreases as the rotor turns faster. Because of the scales, the FG signal and the modified FG signal appear as a single trace. Thus, the portion within the broken lined circle identified by reference character 342 is expanded so that the FG signal, identified by reference character 346, and the modified FG signal, identified by reference character 348, are separated out. The modified FG signal may be referred to as an adjusted FG signal or a pseudo FG signal. In this plot, the delta or the difference in the rising edges of the FG signal and the modified FG signal identified by the numbers 1, 2, and 3 are increasing with time. The delta or the difference in the rising edges of the FG signal and the modified FG signal identified by number 4 are the same. Thus, lead angle adjustment circuit 200 uses this number as the multiplier A shown in EQT. 1.

Figure 11:
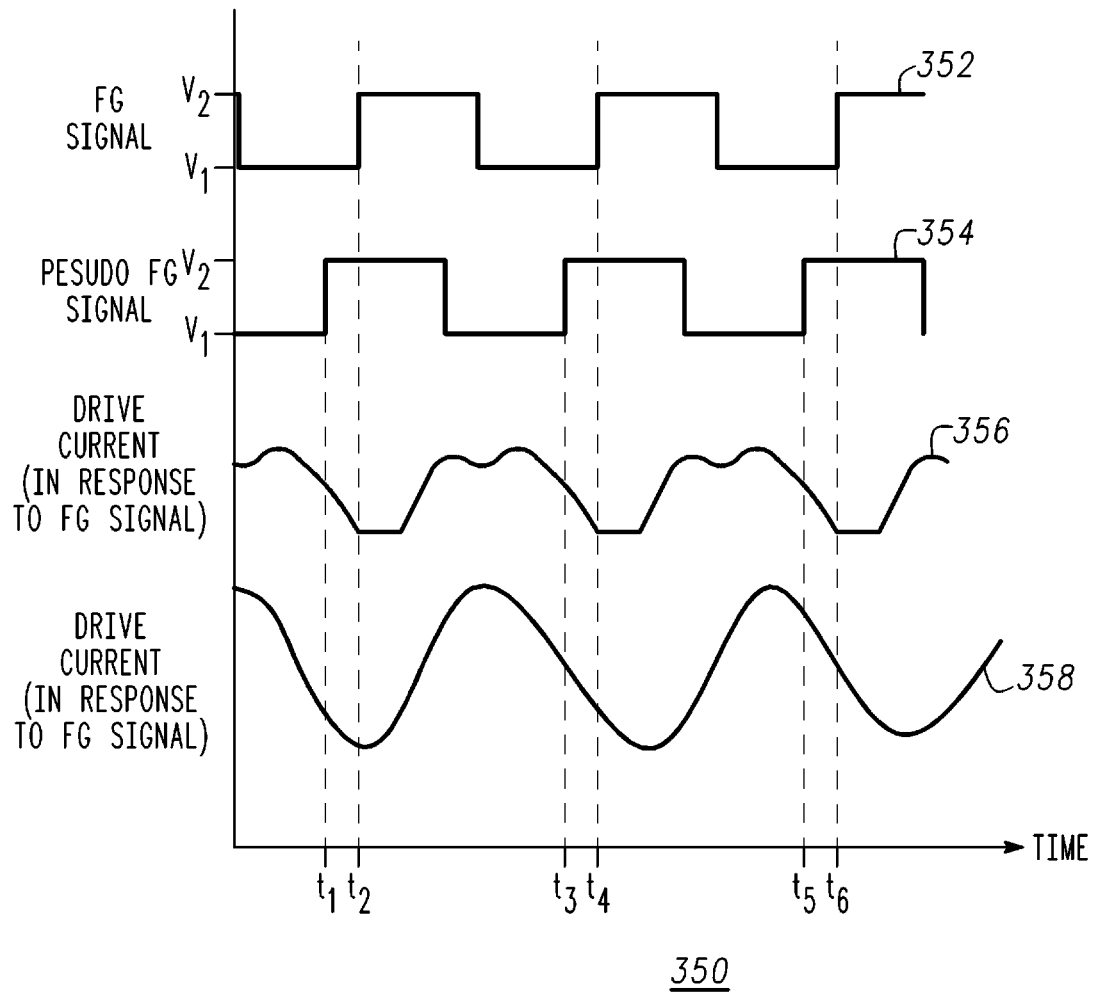
FIG. 11 is a plot illustrating an improvement in the drive current in accordance with an embodiment of the present invention.

FIG. 11 is a plot 350 illustrating the FG signal 352, the modified FG signal 354, a drive current waveform 356 generated in response to the FG signal 352, and a drive current waveform 358 generated in response to the modified FG signal 352. FIG. 11 shows the improvement in the drive signal in response to the modified FG signal, i.e., drive signal 358 does not have the oscillations or the cutoff portions present in drive signal 356.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A method for adjusting a drive signal, comprising:

providing a drive circuit, wherein the drive circuit generates the drive signal;

determining a period of the drive signal;

determining a first advance angle and determining a second advance angle, wherein the first advance angle is a minimum advance angle and the second advance angle is a maximum advance angle;

extracting an advance angle count value from a storage register in accordance with the period of the drive signal;

using the advance angle count value and a first control signal to determine an advance angle adjustment range wherein the first control signal is from a source external to the drive circuit; and using the advance angle adjustment range and a second control signal to determine an advance angle adjustment range start angle wherein the second control signal is from another source external to the drive circuit.

2. The method of claim 1, further including determining an angle determination slope using the first advance angle and the second advance angle.

3. The method of claim 1, further including generating the drive signal in response to the advance angle adjustment range start angle.

4. The method of claim 1, further including terminating advance angle processing in response to the lead angle becoming equal to a target angle value.

5. The method of claim 1, further including continuing to adjust the lead angle in response to the lead angle not matching a target angle value.

6. The method of claim 1, further including receiving the first control signal via a first input and receiving the second control signal via a second input.

7. A method for adjusting a drive signal, providing a drive signal;

determining a period of the drive signal;

determining a first advance angle and determining a second advance angle;

determining an angle determination slope using the first advance angle and the second advance angle;

extracting an advance angle count value from a storage register in accordance with the period of the drive signal;

one of using the advance angle count value and a first control signal to determine an advance angle adjustment range wherein the first control signal is from a source external to the drive circuit or using an advance angle count range to determine an advance angle adjustment range wherein the second control signal is from one of the source external to the drive circuit or another source external to the drive circuit; and adjusting the drive signal in response to the advance angle adjustment range.

8. The method of claim 7, wherein the first advance angle is a minimum advance angle and the second advance angle is a maximum advance angle.

9. The method of claim 7, further including generating the drive signal in response to a first advance angle adjustment range angle.

10. The method of claim 7, further including terminating advance angle processing in response to the lead angle becoming equal to a target angle value.

11. The method of claim 7, further including continuing to adjust the lead angle in response to the lead angle not matching a target angle value.

12. The method of claim 7, further including receiving the first control signal at a first input and receiving the second control signal at a second input.

13. A method for adjusting a drive signal, comprising:
   determining a period of the drive signal;
   determining a first advance angle;
   determining a second advance angle;
   determining an angle determination slope using the first advance angle and the second advance angle;
   extracting an advance angle count value from a storage register in accordance with the period of the drive signal;
   determining an advance angle adjustment range; and
   generating a drive signal in response to the advance angle adjustment range.

14. The method of claim 13, wherein determining the advance angle adjustment range comprises one of using the advance angle count value and a first control signal to determine an advance angle adjustment range or using an advance angle count range and a second control signal to determine the advance angle adjustment range.

15. The method of claim 13, further including terminating advance angle processing in response to the lead angle becoming equal to a target angle value.

* * * * *